United States Patent
Kamio et al.

(10) Patent No.: US 12,118,824 B2
(45) Date of Patent: Oct. 15, 2024

(54) FACE DETECTION METHOD AND SERVER

(71) Applicant: PANASONIC I-PRO SENSING SOLUTIONS CO., LTD., Fukuoka (JP)

(72) Inventors: Takashi Kamio, Tokyo (JP); Eisaku Miyata, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 368 days.

(21) Appl. No.: 17/169,937

(22) Filed: Feb. 8, 2021

(65) Prior Publication Data

US 2021/0286978 A1    Sep. 16, 2021

(30) Foreign Application Priority Data

Mar. 12, 2020    (JP) .................................. 2020-043111

(51) Int. Cl.
*G06K 9/00*    (2022.01)
*G06V 20/40*    (2022.01)
(Continued)

(52) U.S. Cl.
CPC ............ *G06V 40/173* (2022.01); *G06V 20/40* (2022.01); *G06V 40/161* (2022.01);
(Continued)

(58) Field of Classification Search
CPC ........ G06V 10/22; G06V 10/25; G06V 20/40; G06V 20/52; G06V 40/161; G06V 40/166;
(Continued)

(56) References Cited

U.S. PATENT DOCUMENTS

2001/0036298 A1*  11/2001  Yamada ............... G06V 40/161
                                                                382/118
2007/0046426 A1*  3/2007  Ishibashi .............. G07C 9/257
                                                                340/5.82
(Continued)

FOREIGN PATENT DOCUMENTS

JP    2004-355377    12/2004
JP    2006-011728    1/2006
(Continued)

OTHER PUBLICATIONS

Office Action from Japan Patent Office (JPO) in Japanese Patent Appl. No. 2020-043111, dated Jan. 30, 2024, together with an English language translation.

*Primary Examiner* — Michael J Vanchy, Jr.
(74) *Attorney, Agent, or Firm* — Greenblum & Bernstein, P.L.C.

(57) ABSTRACT

A face detection method to be implemented by a camera and a server that are communicably connected to each other includes the steps of: acquiring a captured video captured by the camera; detecting a face of one or more persons based on the captured video; generating one or more face cut-out images by cutting out a region of the detected face; counting a number of detection times that a person who is the same as or similar to a person in the face cut-out image is detected in a predetermined detection period; determining a category of the person based on the number of detection times; and outputting the face cut-out image corresponding to the person, the number of detection times corresponding to the person, and the category corresponding to the person in association with each other.

16 Claims, 8 Drawing Sheets

(51) Int. Cl.
*G06V 40/16* (2022.01)
*G07C 9/25* (2020.01)
*G08B 13/196* (2006.01)
*G06V 10/22* (2022.01)
*G06V 10/25* (2022.01)
*G06V 20/52* (2022.01)
*G06V 40/50* (2022.01)

(52) U.S. Cl.
CPC .......... *G06V 40/166* (2022.01); *G06V 40/172* (2022.01); *G07C 9/257* (2020.01); *G08B 13/19613* (2013.01); *G06V 10/22* (2022.01); *G06V 10/25* (2022.01); *G06V 20/52* (2022.01); *G06V 40/50* (2022.01)

(58) Field of Classification Search
CPC .... G06V 40/172; G06V 40/173; G06V 40/50; G07C 9/257; G08B 13/19613
See application file for complete search history.

(56) References Cited

U.S. PATENT DOCUMENTS

| | | |
|---|---|---|
| 2011/0063441 A1 | 3/2011 | Asa et al. |
| 2016/0012280 A1* | 1/2016 | Ito .................. G06V 40/173 |
| | | 382/305 |
| 2018/0136615 A1* | 5/2018 | Kim .................. G06N 3/08 |
| 2018/0157898 A1 | 6/2018 | Tsuneno et al. |
| 2020/0134954 A1* | 4/2020 | Yi .................. G07C 9/23 |
| 2020/0234553 A1 | 7/2020 | Kamio et al. |

FOREIGN PATENT DOCUMENTS

| | | | |
|---|---|---|---|
| JP | 2011-060058 | | 3/2011 |
| JP | 2013-005336 | | 1/2013 |
| JP | 2019149641 A | * | 9/2019 |
| JP | 2019-215899 | | 12/2019 |
| JP | 2019-007595 | | 8/2020 |
| JP | 2020-119066 | | 8/2020 |

* cited by examiner

| | DETECTION ITEMS | CONDITION |
|---|---|---|
| 1 | TIME PERIOD | 10:00~20:00 |
| 2 | GENDER | MALE |
| 3 | AGE | 40's to 60's |
| 4 | CAMERA | XXXX |
| 5 | DETECTION PERIOD | ONE MONTH |
| 6 | NUMBER OF TIMES | 6 |

FACE DETECTION METHOD AND SERVER

CROSS-REFERENCE TO RELATED APPLICATIONS

This application is based on and claims priority under 35 USC 119 from Japanese Patent Application No. 2020-043111 filed on Mar. 12, 2020, the contents of which are incorporated herein by reference.

TECHNICAL FIELD

The present disclosure relates to a face detection method, a computer readable non-transitory storage medium on which a face detection program is stored, and a server.

BACKGROUND ART

Patent Literature 1 discloses an information processing device that receives face image data from a camera that captures an image of each of a plurality of zones of a building and determines permission/non-permission of entry for a person in the face image data. With this information processing device, based on a first table in which camera identification information of a plurality of cameras is associated with a plurality of zones, a second table in which registered face image data is associated with a zone for which entry of a person in the registered face image data is permitted, and camera identification information of a camera that captures a person in face image data, an image capturing zone where a person in face image data is captured is determined by referring to the first table, and based on the determined image capturing zone, permission/non-permission of entry of the person in the face image data is determined by referring to the second table. According to Patent Literature 1, it is possible to determine permission/non-permission of entry of a person in face image data captured by a camera, and notify a user of entry into a zone of a non-permitted person.

CITATION LIST

Patent Literature

Patent Literature 1: Japanese Patent Application No. 2019-7595

SUMMARY OF INVENTION

However, in Patent Literature 1, since a person whose entry is permitted needs to be registered in advance, it is difficult to apply to the determination of the type (category) of a person who enters a building such as a store, a hospital, a police station, and a school that a large number of unspecified persons enter and exit.

The present disclosure has been proposed in view of the above circumstances, and an object thereof is to provide a face detection method, a face detection program, and a server for presenting a face image of a person to be noticed in a captured video and efficiently supporting a monitoring service targeted for person.

Solution to Problem

The present disclosure provides a face detection method to be implemented by a camera and a server that are communicably connected to each other. The face detection method includes the steps of acquiring a captured video captured by the camera; detecting a face of one or more persons based on the captured video; generating one or more face cut-out images by cutting out a region of the detected face; counting a number of detection times that a person who is a same as or similar to a person in the face cut-out image is detected in a predetermined detection period; determining a category of the person based on the number of detection times; and outputting the face cut-out image corresponding to the person, the number of detection times corresponding to the person, and the category corresponding to the person in association with each other.

In addition, the present disclosure provides a computer readable non-transitory storage medium on which a face detection program executed by a server communicably connected to a camera is stored. The face detection program causing the server to execute a process including: acquiring a captured video captured by the camera; detecting a face of one or more persons based on the captured video; generating one or more face cut-out images by cutting out a region of the detected face; counting a number of detection times that a person who is a same as or similar to a person in the face cut-out image is detected in a predetermined detection period; determining a category of the person based on the number of detection times; and outputting the face cut-out image corresponding to the person, the number of detection times corresponding to the person, and the category corresponding to the person in association with each other.

In addition, the present disclosure provides a server communicably connected to a camera. The server includes an acquisition unit that acquires a captured video captured by the camera; a processor that detects a face of one or more persons based on the captured video acquired by the acquisition unit, generates one or more face cut-out images by cutting out a region of the detected face, counts a number of detection times a that person who is the same as or similar to a person in the face cut-out image is detected in a predetermined detection period, and determines a category of the person based on the number of detection times; and an output unit that outputs the face cut-out image corresponding to the person, the number of detection times corresponding to the person, and the category corresponding to the person in association with each other.

According to the present disclosure, it is possible to present a face image of a person to be noticed in a captured video and to efficiently support a monitoring service targeted for person.

DESCRIPTION OF EMBODIMENTS

Hereinafter, an embodiment in which configurations and effects of a face detection method, a face detection program, and a server according to the present disclosure are disclosed will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure for those skilled in the art, and are not intended to limit the subject matter recited in the claims.

Figure 1:
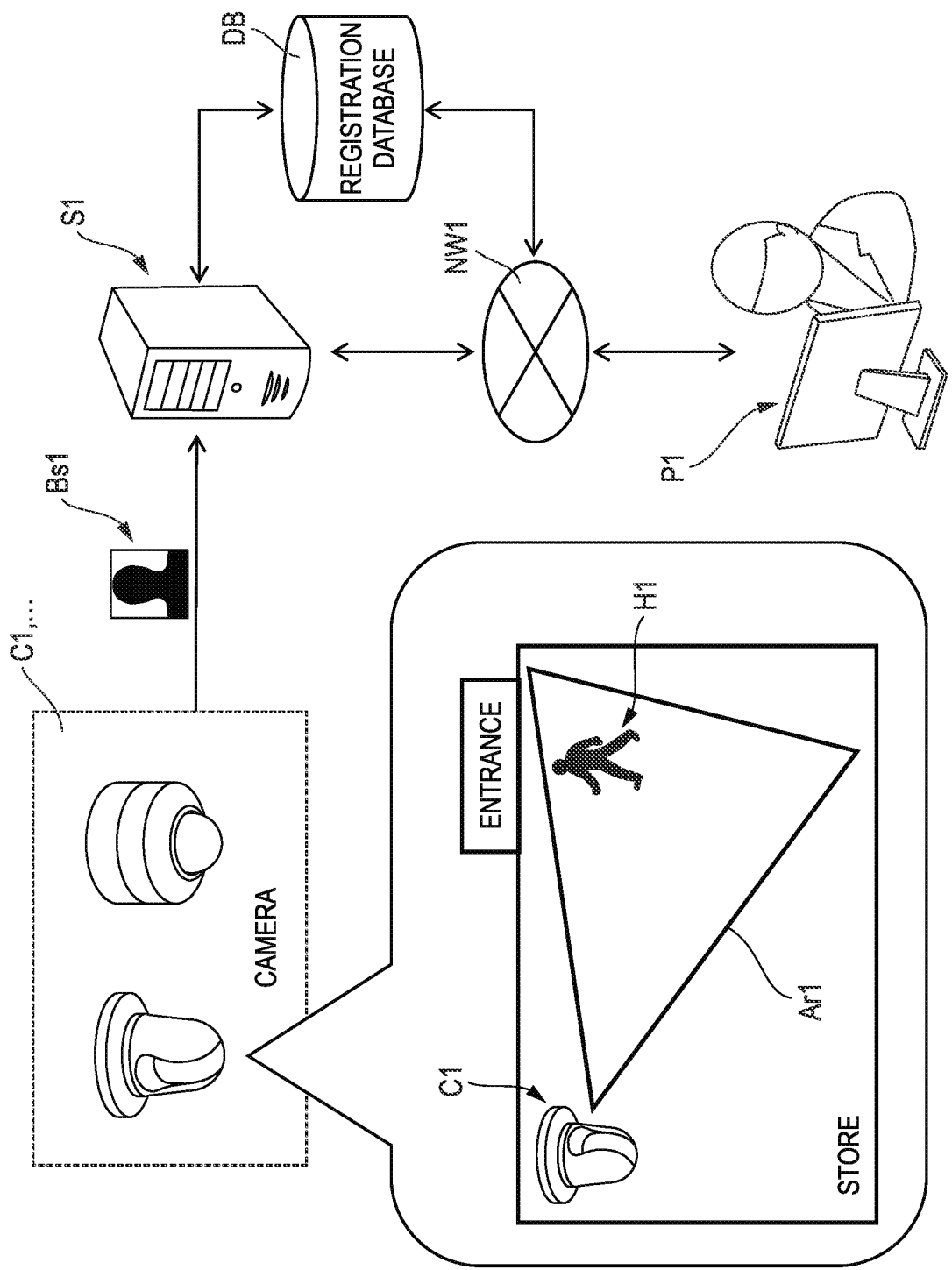
FIG. 1 is a diagram illustrating a use case (indoor) of a face detection system according to an embodiment.
Figure 2:
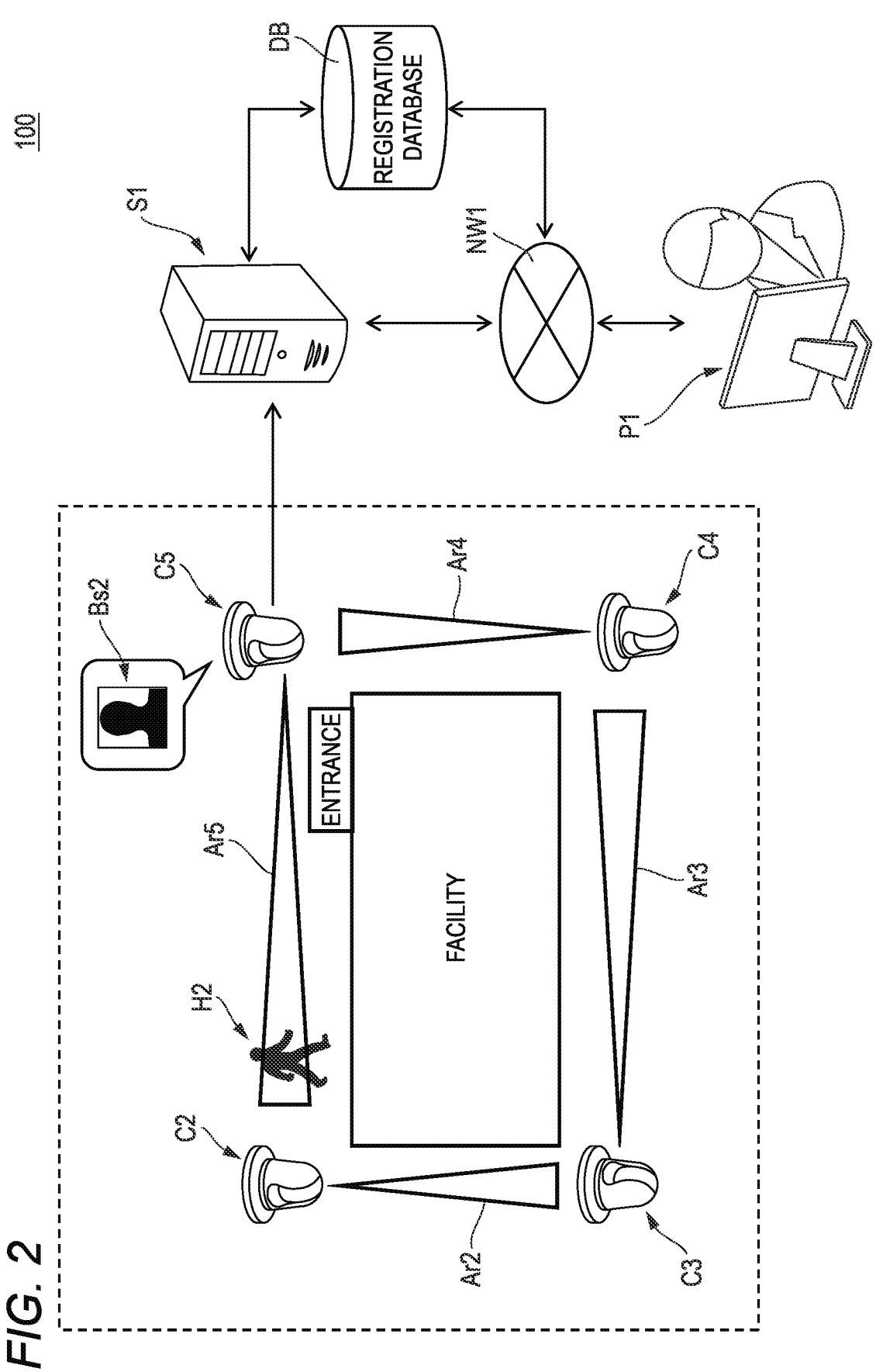
FIG. 2 is a diagram illustrating a use case (outdoor) of the face detection system according to the embodiment.

Use case examples of a face detection system 100 according to an embodiment will be described with reference to FIGS. 1 and 2. FIG. 1 is a diagram illustrating a use case (indoor) of the face detection system 100 according to the embodiment. FIG. 2 is a diagram illustrating a use case (outdoor) of the face detection system 100 according to the embodiment. Although not illustrated in FIGS. 1 and 2, the face detection system 100 according to the embodiment is not limited to an example in which cameras are installed indoors or outdoors, and the cameras may be installed indoors and outdoors.

The face detection system 100 according to the embodiment detects a person appearing in a recorded video or a live video captured by one or more cameras, based on a detection condition set in advance by a user (for example, a staff member of a facility such as a hospital, a police station, or a school, a staff member of a security company, an administrator, and the like). The face detection system 100 generates a face cut-out image that is generated by performing cutting in a region including at least a face of the detected person, counts the number of times the person corresponding to the face cut-out image is detected in a predetermined detection period, and provide the face cut-out image and the detected number of times of the detected person to the user.

The face detection system 100 according to the embodiment includes a camera C1, a terminal device P1, a server S1, and a registration database DB. Note that at least one camera C1 is provided. The registration database DB is not an essential configuration, and may be incorporated in a configuration of the server S1 or may be incorporated in a configuration of the terminal device P1.

Each of a plurality of cameras C1, C2, C3, C4, C5, . . . is installed indoors or outdoors at a fixed angle of view, and is connected to the server S1 so as to be able to perform data communication. Each of the plurality of cameras C1, . . . performs image processing on each of a plurality of captured images, and determines whether one or more persons appearing in the plurality of captured images are the same person. Each of the plurality of cameras C1, . . . selects a best-shot image for each person from the plurality of captured images in which it is determined images of the same persons are captured. Each of the plurality of cameras C1, . . . associates and transmits the selected best-shot image for each person, metadata of the best-shot image, and own-camera identification information (for example, a manufacturing number, a management number, an identification number, and a name), to the server S1. The camera identification information to be associated with the best-shot image is transmitted to the server S1 in advance by each of the plurality of cameras C1, . . . and is stored in a memory in the server S1.

As the best-shot image referred to here, from the viewpoint of visibility or recognition authentication processing accuracy, it is desirable that, for example, an image in which the person faces the front, an image that is not blurred, an image in which the eyes of the person are open, or the like is selected. Further, the metadata referred to here is data at least containing information on an image capturing date and time when the best-shot image is captured.

Although an example is illustrated in which each of the plurality of cameras C1, . . . according to the embodiment is a camera capable of selecting a best-shot image, the present invention is not limited thereto. Each of the plurality of cameras C1, . . . may not be able to select a best-shot image. Further, each of the plurality of cameras C1, . . . may directly transmit each of the plurality of captured images to the server S1.

Here, a use case of the plurality of cameras C1, . . . will be described below. For example, the camera C1 in a use case illustrated in FIG. 1 is installed in a store (that is, indoors), and captures an image of an image capturing area Ar1. Here, the image capturing area Ar1 is set to be an area where an image of a person H1 entering from an entrance of the store can be captured. The camera C1 selects a best-shot image Bs1 of the person H1 from each of a plurality of captured images including the image capturing area Ar1, and transmits the selected best-shot image Bs1 to the server S1.

For example, each of the plurality of cameras C2, C3, C4, and C5 in a use case illustrated in FIG. 2 is installed around a facility (that is, outdoors), and captures an image of a person H2 located around the facility. The camera C2 captures an image of an image capturing area Ar2. The camera C3 captures an image of an image capturing area Ar3. The camera C4 captures an image of an image capturing area Ar4. The camera C5 captures an image of an image capturing area Ar5. The camera C5 selects a best-shot image Bs2 of the person H2 from each of a plurality of captured images including the image capturing area Ar5, and transmits the selected best-shot image Bs2 to the server S1.

Although not illustrated in FIGS. 1 and 2, each of the plurality of cameras C1, . . . may be installed indoors and outdoors.

The server S1 is connected to the terminal device P1, the registration database DB, and the plurality of cameras C1, . . . via a network NW1 so as to be capable of data communication with each other. The number of cameras may be one or more. The server S1 may be configured integrally with the registration database DB. The server S1 records in advance the camera identification information of each of the plurality of cameras C1, . . .

Based on the camera identification information associated with a best-shot image transmitted from each of the plurality of cameras C1, . . . the server S1 acquires a detection condition used for the best-shot image. The server S1 detects a face of a person from the best-shot image, and generates a face cut-out image obtained by cutting out a region of the detected face of the person. Note that in a case where a plurality of captured images is transmitted from each of the plurality of cameras C1, . . . , the server S1 selects a best-shot image for each person from each of the plurality of captured images, detects a face of a person from the selected best-shot image, and generates a face cut-out image by cutting out a region of the detected face of the person.

The server S1 determines whether the generated face cut-out image satisfies a detection condition or whether the face cut-out image is the same as or similar to any of a plurality of face images registered (stored) in the registration database DB. Based on a determination result, the server S1 generates a search result including the face cut-out image and the number of times the person in the cut-out image is detected, or generates an alert notification screen including a face image registered in the registration database DB and the face cut-out image, and transmits the search result or the alert notification screen to the terminal device P1.

The terminal device P1 is, for example, a personal computer (PC), a notebook PC, a tablet terminal, a smartphone, or the like, and is connected to the registration database DB and the server S1 via the network NW1 in a wired or wireless manner so as to be able to communicate with each other. The wireless communication referred to here is implemented by a wireless network, such as a wireless local area network (LAN), a wireless wide area network (WAN), a fourth-generation mobile communication system (4G), long term evolution (LTE), LTE-Advanced, a fifth generation mobile communication system (5G), Wi-Fi (registered trademark), or Wireless Gigabit (WiGig).

The terminal device P1 includes a user interface (UI) that receives a user operation, and transmits and registers each of a plurality of face images selected by the user to the registration database DB. In addition, the terminal device P1 transmits a detection condition input by the user to the server S1 via the network NW1.

The terminal device P1 acquires the search result transmitted from the server S1 and displays the search result on a monitor. The detection result includes a thumbnail image of one or more face cut-out images or a face image registered in the registration database DB, and information of a person category of a thumbnail image or a face image. When receiving, from the server S1, an alert notification screen indicating that a person similar to or the same as a face image registered in advance in the registration database DB is detected, the terminal device P1 displays the alert notification screen on the monitor.

The network NW1 is a wireless network or a wired network. The wireless communication is, for example, a wireless local area network (LAN), a wireless wide area network (WAN), a fourth-generation mobile communication system (4G), long term evolution (LTE), LTE-Advanced, a fifth generation mobile communication system (5G), Wi-Fi (registered trademark), or Wireless Gigabit (WiGig).
The wired network may be an intranet or the Internet, for example.

The registration database DB associates and registers (stores) each of the plurality of face images input by the user in advance, the information of the person category of each of the plurality of face images, and information of the number of detection times. The registration database DB registers (stores) a face cut-out image of a person satisfying a detection condition transmitted from the server S1, and when receiving from the server S1 a change command for the person category of a registered face cut-out image (that is, a face image), the registration database DB executes person category change processing based on the change command. The registration database DB may be configured integrally with the server S1 or may be configured integrally with the terminal device P1.

Figure 3:
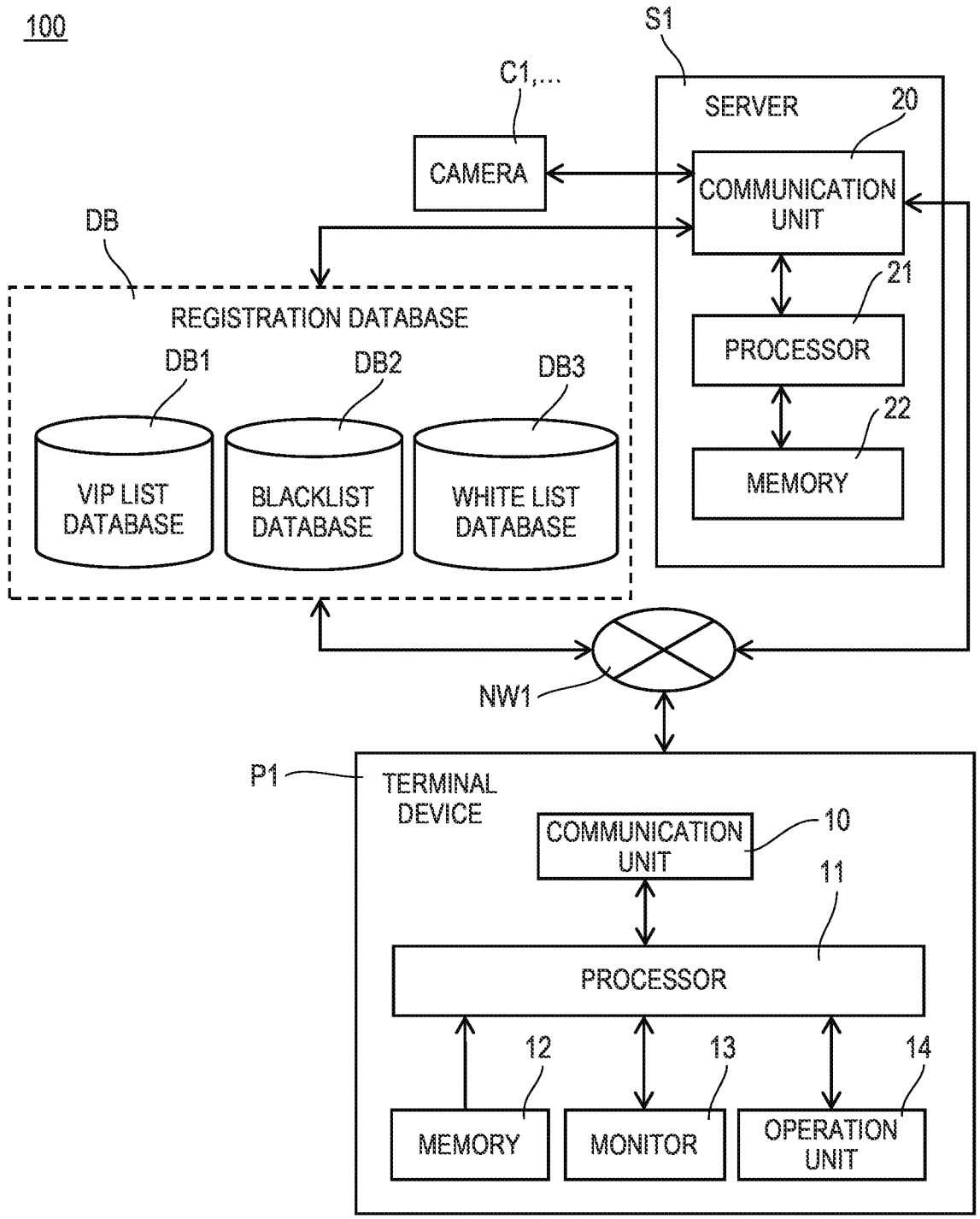
FIG. 3 is a diagram illustrating an internal configuration example of the face detection system according to the embodiment.

FIG. 3 is a diagram illustrating an internal configuration example of the terminal device P1 and the server S1 in the face detection system 100 according to the embodiment.

The terminal device P1 includes a communication unit 10, a processor 11, a memory 12, a monitor 13, and an operation unit 14.

The communication unit 10 is connected to the registration database DB and a communication unit 20 in the server S1 via the network NW1 so as to be capable of data communication with each other. The communication unit 10 transmits a search request (control signal) to the server S1 that includes a face image, which is designated by the user and received by the operation unit 14, or an input detection condition. Further, the communication unit 10 receives a search result or an alert notification screen from the server S1 and inputs the search result or the alert notification screen to the processor 11.

The processor 11 is configured with, for example, a central processing unit (CPU) or a field programmable gate array (FPGA), and performs various types of processing and control in cooperation with the memory 12. Specifically, the processor 11 refers to a program and data held in the memory 12, and executes the program to implement functions of units.

The processor 11 generates a search request (control signal) including a detection condition based on a user operation received by the operation unit 14. Further, the processor 11 converts a face cut-out image included in the search result transmitted from the server S1 into a thumbnail image (for example, a detected face image PC11 in FIG. 6), and outputs the converted thumbnail image, information of a person category of the thumbnail image, and the number of detection times of the person of the thumbnail image to the monitor 13 to be displayed thereon.

The memory 12 includes, for example, a random access memory (RAM) serving as a work memory used when various types of processing of the processor 11 is performed, and a read only memory (ROM) that stores data and a program specifying an operation of the processor 11. In the RAM, data or information generated or acquired by the processor 11 is temporarily stored. In the ROM, a program for specifying an operation of the processor 11 is written.

The monitor 13 is configured with a display such as a liquid crystal display (LCD) or an organic electroluminescence (EL). The monitor 13 displays the search result or the alert notification screen transmitted from the server S1.

The operation unit 14 is a user interface that receives a user operation, and is configured with, for example, a mouse, a keyboard, a touch panel, a touch pad, a pointing device, or the like. The operation unit 14 outputs a signal based on a user operation to the processor 11. The operation unit 14 receives, for example, an input operation relating to a face image registered in the registration database DB from the user, an input operation relating to a detection condition from the user, and the like.

Next, an internal configuration of the server S1 will be described. The server S1 includes a communication unit 20, a processor 21, and a memory 22.

The communication unit 20, as an example of an acquisition unit and an output unit, is connected to the communication unit 10 of the terminal device P1, the registration database DB, and each of the plurality of cameras C1, . . . so as to be capable of data communication with each other. The communication unit 20 outputs the search request (control signal) transmitted from the terminal device P1 to the processor 21. The communication unit 20 outputs a best-shot image transmitted from each of the plurality of cameras C1, . . . to the processor 21. The communication unit 20 transmits a search result or an alert notification screen generated by the processor 21 to the communication unit 10 in the terminal device P1.

The processor 21 is configured with, for example, a CPU or an FPGA, and performs various types of processing and control in cooperation with the memory 22. Specifically, the processor 21 refers to a program and data held in the memory 22 and executes the program so as to implement functions of units.

When receiving a best-shot image transmitted from each of the plurality of cameras C1, . . . the processor 21 detects a face of a person from the best-shot image. The processor 21 generates a face cut-out image by cutting out a region of the detected face of the person, and analyzes attributes (age, sex, height, and the like) of the person in the face cut-out image. Further, the processor 21 specifies a camera that captures the best-shot image based on camera identification information associated with the best-shot image, and acquires a detection condition set by the specified camera, or searches and acquires a detection condition containing identification information of the specified camera among a plurality of detection conditions. The processor 21 determines whether the person in the face cut-out image satisfies the acquired detection condition. The detection condition referred to here is each detection item, other than detection items "detection period" and "number of times" among a plurality of detection items included in the detection condition (see FIG. 4). The detection items "detection period" and "number of times" are used for determination of a category of the person in the face cut-out image, and the like.

When it is determined that the person in the face cut-out image satisfies the detection condition, the processor 21 refers to each of the plurality of face images registered in the registration database DB, and compares the face cut-out image with each of the plurality of face images registered in the registration database DB.

When it is determined that a face image same as or similar to the face cut-out image is registered in the registration database DB, the processor 21 acquires the number of detection times of the person in the face cut-out image. The processor 21 determines the category of this person based on the number of detection times of the person in the acquired face cut-out image and based on a category of the detection condition that the person in the face cut-out image satisfies. The processor 21 increments the number of detection times of this person registered in the registration database DB. The processor 21 generates a search result containing the face image registered in the registration database DB, the generated face cut-out image, and the incremented number of detection times, and transmits the search result to the terminal device P1, and outputs (displays) the search result to the monitor 13.

When the determined category is different from the category registered in the registration database DB, the processor 21 increments the number of detection times of this person registered in the registration database DB, changes the information of the category of this person to information of the determined category, and registers (records) the information.

Also, when the person in the face cut-out image satisfies a predetermined category, based on the category of the detection condition, the processor 21 transmits the face cut-out image to the registration database DB and registers (stores) the face cut-out image in a database corresponding to the category of the detection condition (that is, a very important person (VIP) list database DB1 (see FIG. 3) or a blacklist database DB2 (see FIG. 3) in the registration database DB).

For example, when the person in the face cut-out image corresponds to a detection condition for searching for a loyal customer or loyal customer and it is determined that both the detection items "detection period" and "number of times" included in the detection conditions are satisfied, the processor 21 transmits and registers (stores) the face cut-out image in the VIP list database DB1 in the registration database DB. When the person in the face cut-out image corresponds to a detection condition for searching for a suspicious person and it is determined that both the detection items "detection period" and "number of times" included in the detection conditions are satisfied, the processor 21 transmits and registers (stores) the face cut-out image in the blacklist database DB2 in the registration database DB.

On the other hand, when it is determined that no face image the same as or similar to the face cut-out image is registered in the registration database DB, the processor 21 determines a category of the person in the face cut-out image based on a category of the detection condition that the person in the face cut-out image satisfies. The processor 21 transmits and registers (stores) the face cut-out image and the category of the person in the face cut-out image in association with each other to and in the registration database DB. Further, the processor 21 generates a search result including a face image registered in the registration database DB, the generated face cut-out image, and the incremented number of detection times, and transmits the search result to the terminal device P1, and outputs (displays) the search result to the monitor 13.

When the face image is registered (stored) in the VIP list database DB1 (see FIG. 3) or the blacklist database DB2 (see FIG. 3), the processor 21 generates an alert notification screen (see FIG. 8) including the face image registered in the VIP list database DB1 or the blacklist database DB2 and the face cut-out image, or generates a search result in which a detection field of this person is highlighted by a detection frame, and transmits the alert notification screen or the search result to the terminal device P1 via the network NW1.

The memory 22 includes, for example, a RAM serving as a work memory used when various types of processing of the processor 21 is performed, and a ROM that stores data and a program specifying an operation of the processor 21. In the RAM, data or information generated or acquired by the processor 21 is temporarily stored. In the ROM, a program for specifying an operation of the processor 21 is written. The memory 22 stores information of an installation position where each of the plurality of cameras C1, . . . is installed and the identification information of each of the plurality of cameras C1, . . . in association with each other.

The memory 22 includes, for example, a RAM serving as a work memory used when various types of processing of the processor 21 is performed, and a ROM that stores data and a program specifying an operation of the processor 21. In the RAM, data or information generated or acquired by the processor 21 is temporarily stored. In the ROM, a program for specifying an operation of the processor 21 is written.

The registration database DB is connected to the server S1 and the terminal device P1 so as to be capable of wired or wireless communication, and registers (stores) each of a plurality of face images registered in advance by a user operation and a face cut-out image of a person satisfying a detection condition transmitted from the server S1. The registration database DB includes the VIP list database DB1, the blacklist database DB2, and a white list database DB3. The VIP list database DB1, the blacklist database DB2, and the white list database DB3 are preferred to be configured separately not integrally. The face detection system 100 according to the embodiment may include the white list database DB3, and any one of the VIP list database DB1 and the blacklist database DB2.

The VIP list database DB1 registers (stores) each of a plurality of face images registered in advance by a user operation. In addition, the VIP list database DB1 registers (stores) a face cut-out image of a person having a category such as a loyal customer or a loyal customer among persons of face cut-out images transmitted from the server S1, and the number of detection times thereof in association with each other. The VIP list database DB1 may register customer (person) information based on a user operation and a face image (face cut-out image) in association with each other.

When a person registered in the VIP list database DB1 is detected, the server S1 generates an alert notification screen indicating that a person registered in the VIP list database DB1 is detected, or generates a search result in which a detection field of this person is highlighted by a detection frame, and transmits the alert notification screen or the search result to the terminal device P1, and outputs the alert notification screen or the search result to the monitor.

The blacklist database DB2 registers (stores) each of a plurality of face images registered in advance by a user operation. In addition, the blacklist database DB2 registers (stores) a face cut-out image of a person having a category such as a target or a suspicious person among persons of face cut-out images transmitted from the server S1, and the number of detection times thereof in association with each other. The target referred to here is a person involved in a case, accident, or the like who is an object to be investigated and searched by a police officer, an administrator, or a security person. The blacklist database DB2 may register customer (person) information based on a user operation and a face image (face cut-out image) in association with each other.

When a person registered in the blacklist database DB2 is detected, the server S1 generates an alert notification screen indicating that a person registered in the blacklist database DB2 is detected, or generates a search result in which a detection field of this person is highlighted by a detection frame, and transmits the alert notification screen or the search result to the terminal device P1, and outputs the alert notification screen or the search result to the monitor.

The white list database DB3 registers (stores) in advance, by a user operation, each of a plurality of face images of persons (for example, a staff of a store, an employee of a building, a teacher of a school, a cleaner of a building, an employee of a security company, a police officer of a police station, a person concerned with a hospital, and the like) who frequent a building such as a commercial facility, a store, a police station, a hospital, a school or the like that a large number of unspecified persons can enter and exit and where each of the plurality of cameras C1, . . . is installed. The face image registered in the white list database DB3 may be, for example, a face image printed on a license, an employee ID card or the like.

When a person registered in the white list database DB3 is detected, the server S1 omits generation of an alert notification screen for this person, omits determination as to whether this person satisfies a detection condition, and deletes information related to this person and included in a search result.

Figure 4:
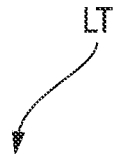
FIG. 4 is a table illustrating an example of detection conditions.

Here, detection conditions set by a user will be described with reference to FIG. 4. FIG. 4 is a table illustrating an example of a detection condition LT. The detection condition LT at least includes detection items "detection period" and "number of times" based on an input operation by the user, and is generated by the terminal device P1. It is needless to say that the detection items and conditions shown in FIG. 4 are merely examples, and the present invention is not limited thereto.

The detection item "detection period" may be set to a condition of an indefinite period. Although not shown in FIG. 4, the detection item "number of times" may be set to have a plurality of categories corresponding to the number of detection times, for example, attention for five or more times, requiring special attention for ten times or more, and suspicious person for 12 times or more.

Further, although not shown in FIG. 4, the detection condition LT may be used to set a category of a person in a face cut-out image that satisfies the detection condition LT and a category of a person in a face cut-out image that does not satisfy the detection condition LT. For example, the user may set a condition of the detection item "detection period" and the detection item "number of times" for a person in a face cut-out image that does not satisfy the detection condition LT, so that a person satisfying the condition of this detection item "detection period" and this detection item "number of times" is determined to be another category "potential loyal customer" or "regular customer". As a result, the user can search for, for example, a person as a potential loyal customer or a regular customer from a plurality of persons who enter and exit a store.

The detection condition LT is generated including a plurality of detection items and conditions corresponding to each of the plurality of detection items. For example, the detection condition LT illustrated in FIG. 4 is generated including six detection items and conditions corresponding to each of the six detection items. The detection condition LT shown in FIG. 4 is set in, for example, a camera installed in a jewel store, and is a condition for detecting a suspicious person. A category of the detection condition LT is set as suspicious person detection, and a face cut-out image satisfying predetermined conditions is registered in the blacklist database DB2.

A detection item "time period" is a condition related to an image capturing date and time of a best-shot image (that is, a face cut-out image) captured by a camera. As illustrated in FIG. 4, an example is shown in which a condition "10:00 to 20:00" is set for the detection item "time period". When it is determined that imaging date and time of a best-shot image (that is, a face cut-out image) captured by a camera corresponds to the condition "10:00 to 20:00", the processor 21 determines that the condition "10:00 to 20:00" of the detection item "time period" is satisfied.

When "24 hours", "0:00 to 23:59" or the like is set as the condition of the detection item "time period", the processor 21 may execute person search processing based on a detection condition, search processing of a person registered in the registration database DB, registration processing to the registration database DB, and the like for 24 hours, that is, constantly.

A detection item "gender" is a condition related to the gender of a person in a best-shot image (that is, a face cut-out image) captured by a camera. As illustrated in FIG. 4, an example is shown in which a condition "male" is set for the detection item "gender". In the example illustrated in FIG. 4, when it is determined that the gender of a person corresponding to a face cut-out image is "male", the server S1 determines that the condition "male" of the detection item "gender" is satisfied.

A detection item "age" is a condition related to the age of a person in a best-shot image (that is, a face cut-out image) captured by a camera. As illustrated in FIG. 4, an example is shown in which a condition "40's to 60's" is set for the detection item "age". In the example illustrated in FIG. 4, when it is determined that the age of a person in a face cut-out image is "40's to 60's", the server S1 determines that the condition "40's to 60's" of the detection item "age" is satisfied.

The detection item "camera" is a condition related to a camera that captures a best-shot image (that is, a face cut-out image). That is, the condition is information of a camera for which the detection conditions shown in FIG. 4 are set. As illustrated in FIG. 4, an example is shown in which a condition "XXXX" is set for the detection item "camera". For the condition, identification information of one or more cameras may be set, or one or more places (for example, buildings, rooms, floors, and the like) in which the cameras are installed may be set. The server S1 determines whether a best-shot image captured by a camera specified by the condition "XXXX" satisfies the conditions corresponding to the detection items.

The detection item "detection period" is a condition related to a detection period of a person in a best-shot image (that is, a face cut-out image) captured by a camera. As illustrated in FIG. 4, an example is shown in which a condition "1 month" is set for the detection item "detection period". In the example illustrated in FIG. 4, the server S1 determines whether a person in a face cut-out image determined to satisfy all the conditions corresponding to the detection items "time period", "gender", and "age" is registered in the registration database DB (that is, whether the face cut-out image is the same as or similar to any of the plurality of face images registered in the registration database DB). The detection period is not limited to the above example, and may be one week, ten days, one month, six months, one year, or the like.

When it is determined that the person in the face cut-out image is not registered in the registration database DB, the server S1 sets, as the detection period, a time period from a timing (image capturing date and time) at which all the conditions corresponding to the detection items "time period", "gender", and "age" are determined (detected) to be satisfied, to an image capturing date and time one month later, and transmits and registers (stores) the face cut-out image to the registration database DB. Management of the detection period may be executed by the server S1 or may be executed by the registration database DB. When the management of the detection period is executed by the registration database DB, the registration database DB may delete a face cut-out image of which an image capturing date and time does not fall within the detection period.

On the other hand, when it is determined that the person in the face cut-out image is registered in the registration database DB, the server S1 sets, as the detection period of the person in the face cut-out image, a time period from a detected timing (imaging date and time) to a timing one month later, and transmits and registers (stores) the face cut-out image to the registration database DB.

When a person registered in the registration database DB is detected again during the detection period indicated by the detection item "detection period" (one month in the example of FIG. 4), the server S1 sets, as a new detection period, a time period from a timing (imaging date and time) at which all the conditions corresponding to the detection items "time period", "gender", and "age" are satisfied, to an image capturing date and time one month later.

Although not shown in FIG. 4, a "valid period" may be set as a detection item different from the detection item "detection period". When a detection item "valid period" (term of validity) is set, the server S1 may determine whether a condition of the detection item "number of times" detected within a detection period indicated by a condition of the detection item "detection period" is satisfied, and register (store) a face cut-out image registered in the registration database DB for a period indicated by a condition of the detection item "valid period" (term of validity). In such a case, when a person registered in the registration database DB is detected again during a period indicated by the detection item "valid period" (term of validity) (one month in the example of FIG. 4), the server S1 sets, as a new valid period, a time period from a timing (imaging date and time) at which all the conditions corresponding to the detection items "time period", "gender", and "age" are satisfied, to an image capturing date and time one month later.

The detection item "number of times" is a condition related to the number of times a person in a best-shot image (that is, a face cut-out image) captured by a camera is detected. Here, the number of detection times is the number of detection times detected in a detection period set in the condition of the detection item "detection period". As illustrated in FIG. 4, an example is shown in which a condition "6" is set for the detection item "number of times".

When it is determined that both the detection item "number of times" and the detection item "detection period" are satisfied, the server S1 changes information of category of this person (for example, in the example of detection condition in FIG. 4, change a category of the person from "important" to "most important" or "suspicious person"), generates an alert notification screen including a face image registered in the registration database DB and a face cut-out image, or a search result in which a detection field of this person is highlighted by a detection frame, and transmits the alert notification screen or the search result to the terminal device P1 via the network NW1, and displays the alert notification screen or the search result on the monitor.

On the other hand, when it is determined that both the detection item "number of times" and the detection item "detection period" are not satisfied, the server S1 compares the face cut-out image with each of a plurality of face images registered in the registration database DB. When it is determined that the face cut-out image is the same as or similar to any one of the plurality of face images registered in the registration database DB, the server S1 acquires and increments the number of detection times of the person in the face image, and generates a search result in which the face image, a face image after increment, and an incremented number of detection times are associated with each other. When it is determined that the face cut-out image is not the same as or similar to any of the plurality of face images registered in the registration database DB, the server S1 generates a search result in which a face image after increment and an incremented number of detection times are associated with each other.

As described above, the face detection system 100 according to the embodiment can generate a search result obtained by detecting (searching) a person based on the detection conditions and present to the user a search result in which a category of the detected person is set based on the number of detection times detected within a detection period set as the detection condition. As a result, the user can intuitively grasp the importance, priority, and the like of the detected (searched) person based on the category of the detected (searched) person included in the search result or based on the alert notification screen, and can efficiently perform monitoring and management service.

Figure 5:
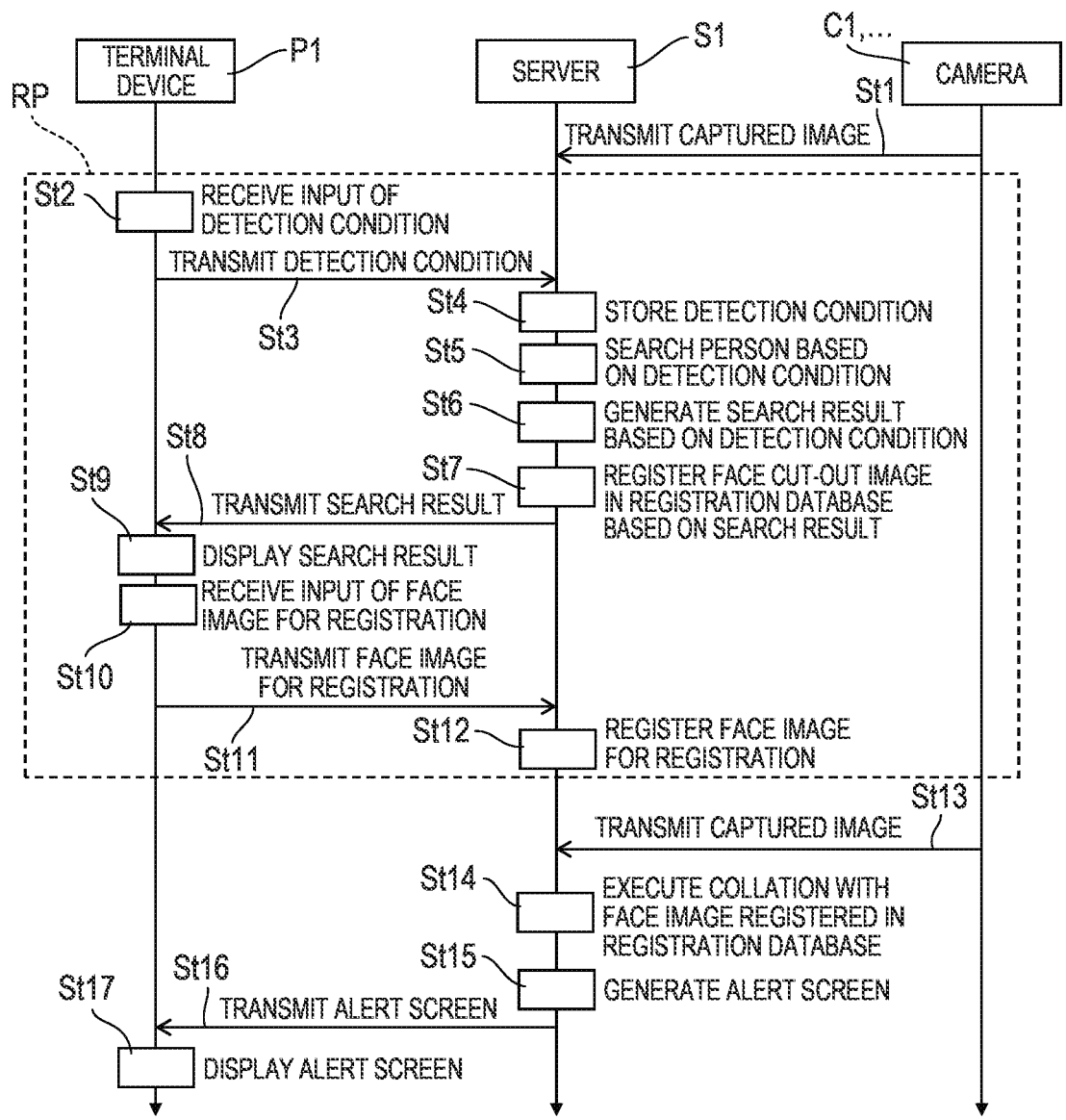
FIG. 5 is a sequence diagram illustrating an example of an operation procedure of the face detection system according to the embodiment.

An operation procedure of the face detection system 100 according to the embodiment will be described with reference to FIG. 5. FIG. 5 is a sequence diagram illustrating an example of the operation procedure of the face detection system 100 according to the embodiment.

First, search processing of the face detection system 100 according to the embodiment will be described.

Each of the one or more cameras C1, . . . selects a best-shot image from a plurality of captured images thereof, and transmits the selected best-shot image to the server S1 (St1). Note that when none of the one or more cameras C1, . . . is provided with a setting function for the best-shot image, each of the plurality of captured images may be transmitted to the server S1.

The terminal device P1 can receive input of a detection condition by a user operation, and generates a detection condition based on a user operation (St2). The terminal device P1 transmits the generated detection condition to the server S1 (St3).

The server S1 stores the detection condition transmitted from the terminal device P1 (St4). The server S1 detects a face of one or more persons from the best-shot images transmitted from the plurality of cameras C1, . . . and generates face cut-out images by cutting out face regions of the detected persons. The server S1 analyzes attributes (for example, age, gender, and height) of a person in the face cut-out image based on the generated face cut-out image. Based on information on cameras indicated by the stored detection condition, the server S1 executes person search based on the detection condition corresponding to a camera that captures the best-shot image (St5).

Here, the search processing executed by the server S1 is a search for a person satisfying all of the plurality of detection items included in the detection conditions except for the detection items "detection period" and "number of times", a search for a person satisfying all of the detection items included in the detection conditions, and a search for a person in the face cut-out image that is the same as or similar to any one of a plurality of face images registered in advance in the VIP list database DB1 or the blacklist database DB2.

The server S1 generates a search result based on the detection condition used in the process of step St5 (St6). Here, the generated search result is generated at least including a face cut-out image and the number of detection times.

The server S1 determines whether the face cut-out image is the same as or similar to any one of the plurality of face images registered in the registration database DB, and when it is determined that the face cut-out image is not registered in the registration database DB, the server S1 registers the face cut-out image in the registration database DB (St7). When it is determined that a face image the same as or similar to the face cut-out image is registered in the registration database DB, the server S1 acquires the face image registered in the registration database DB, and generates a search result including the face image, the face cut-out image, and the number of detection times. The server S1 transmits the generated search result to the terminal device P1 (St8).

As registration processing based on the search result, for the face cut-out image determined to be the same as or similar to the face image registered in the registration database DB in step St7, the server S1 further determines whether the person in the face cut-out image satisfies a condition associated with the detection items "detection period" and "number of times". When it is determined that the person in the face cut-out image satisfies the condition associated with the detection items "detection period" and "number of times", the server S1 sets a category associated with the detection item "number of times" to the person in the face cut-out image. The server S1 registers (stores) the face cut-out image and the number of detection times in one of registration (storage) destinations (that is, one of the VIP list database DB1, the blacklist database DB2, and the white list database DB3) corresponding to the category of the person.

Also, when only the registration database DB is set as the registration (storage) destination, the server S1 may register the category, the face image (face cut-out image), the number of detection times, and the detection period in association with each other in the registration database DB.

The terminal device P1 displays the search result transmitted from the server S1 on the monitor 13 (St9).

Next, registration processing of the face detection system 100 according to the embodiment will be described.

Further, the terminal device P1 receives an input operation by the user with respect to a face image (that is, a face image for registration) to be registered (stored) in one of the VIP list database DB1, the blacklist database DB2, and the white list database DB3 (St10). The terminal device P1 associates the face image (face image for registration) input by the user with information on registration (storage) destination of one of the VIP list database DB1, the blacklist database DB2, and the white list database DB3, in which the face image is to be registered (stored) and which is designated by the user, and transmits the associated face image and information to the server S1 (St11).

The server S1 registers (stores) the face image based on the face image transmitted from the terminal device P1 and the information on the registration (storage) destination associated with the face image (St12). In the operation procedure example illustrated in FIG. 5, the processing of registering (storing) the face image in the VIP list database DB1, the blacklist database DB2, and the white list database DB3 is executed by the server S1, and alternatively may be executed by the terminal device P1.

The terminal device P1 and the server S1 periodically or repeatedly execute processing RP including steps St2 to St12 as necessary.

Next, generation processing of an alert notification screen by the face detection system 100 according to the embodiment will be described.

Each of the one or more cameras C1, . . . continues to capture an image of a person, and when a person in the image capturing area is captured in image, selects a best-shot image of the person from a plurality of captured images, and transmits the selected best-shot image to the server S1 (St13). Note that when none of the one or more cameras C1, . . . is provided with a setting function for the best-shot image, each of the plurality of captured images may be transmitted to the server S1.

The server S1 executes processing of collating a face cut-out image generated by being cut from the best-shot image with each of a plurality of face images registered (stored) in the VIP list database DB1 or the blacklist database DB2 in the registration database DB (St14).

When it is determined that the face cut-out image is the same as or similar to any one of the plurality of face images registered (stored) in the VIP list database DB1 or the blacklist database DB2 in the registration database DB, the server S1 generates an alert notification screen including the registered face image and the face cut-out image (St15). The server S1 transmits the generated alert notification screen to the terminal device P1 (St16).

The terminal device P1 outputs the alert notification screen transmitted from the server S1 to the monitor 13 and displays the alert notification scree (St17).

As described above, the face detection system 100 according to the embodiment can execute the detection (search) processing for a person satisfying the detection condition, the search processing for a person in a face cut-out image same as or similar to any one of a plurality of face images registered (stored) in the VIP list database DB1 and the black list database DB2, and an omission processing of a detection (search) result for a person in a face cut-out image same as or similar to any one of a plurality of face images registered (stored) in the white list database DB3, and can present to the user search results obtained by simultaneously executing at least two types of processing set by the user.

Figure 6:
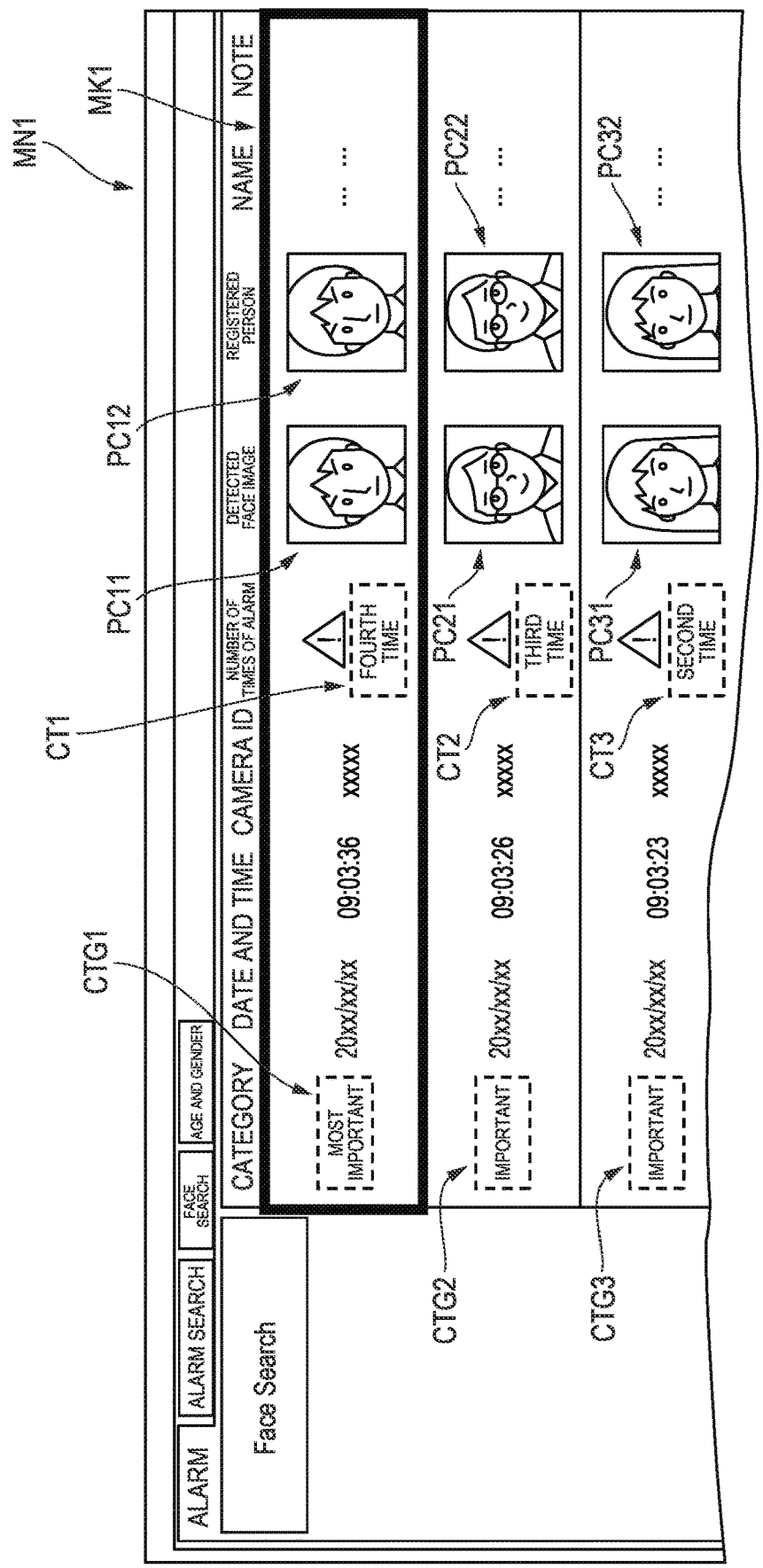
FIG. 6 is a diagram illustrating an example of a search result (loyal customer).

With reference to FIG. 6, a search result related to a loyal customer or loyal customer and generated by the server S1 will be described. FIG. 6 is a diagram illustrating an example of a search result MN1 related to the loyal customer or loyal customer. It is needless to say that the categories shown in FIG. 6 are merely examples, and the present invention is not limited thereto. In the example of the search result MN1 illustrated in FIG. 6, an example is shown in which a condition of the detection item of "number of times" among detection conditions is 4, a category of a person satisfying a condition of the detection item "number of times" being 3 or less is set to "important", and a category of a person satisfying a condition of the detection item "number of times" being 4 or more is set to "most important". Note that the category is not limited to the example of FIG. 6. For example, the category may not be "most important", but may be set to "regular customer", "loyal customer", "loyal customer", and the like.

As a search result, the search result MN1 illustrated in FIG. 6 is generated including a category of a person, an image capturing date and time when the best-shot image is captured, a camera ID (identification) as camera identification information, the number of times of alarm serving as the number of detection times in a detection period, a detected face image as a face cut-out image, a registered person as a face image registered in the registration database DB, and a name of a person in a face cut-out image. It is needless to say that the search result MN1 illustrated in FIG. 6 is merely an example, and the present invention is not limited thereto. The search result MN1 may be generated to include at least a category and a face cut-out image (detected face image). The search result MN illustrated in FIG. 6 includes a search field for each of three persons.

For a person of a detected face image PC11, a face image PC12 is registered in the registration database DB. Since the number of detection times in the detection period is "4" shown in a number of detection times field CT1 and satisfies the condition of the detection item "number of times", the person of the detected face image PC11 is changed from "important" to "most important" in a category field CTG1 by the server S1 and displayed. In addition, since the condition of the detection item "number of times" is satisfied, the search field of the person of the detected face image PC11 is surrounded by a detection frame MK1 and highlighted.

For a person of a detected face image PC21, a face image PC22 is registered in the registration database DB. Since the number of detection times in the detection period is "3" shown in a number of detection times field CT2 and does not satisfy the condition of the detection item "number of times", the person of the detected face image PC21 is displayed as "important" in a category field CTG2.

For a person of a detected face image PC31, a face image PC32 is registered in the registration database DB. Since the number of detection times in the detection period is "2" shown in a number of detection times field CT3 and does not satisfy the condition of the detection item "number of times", the person of the detected face image PC31 is displayed as "important" in a category field CTG3.

Figure 7:
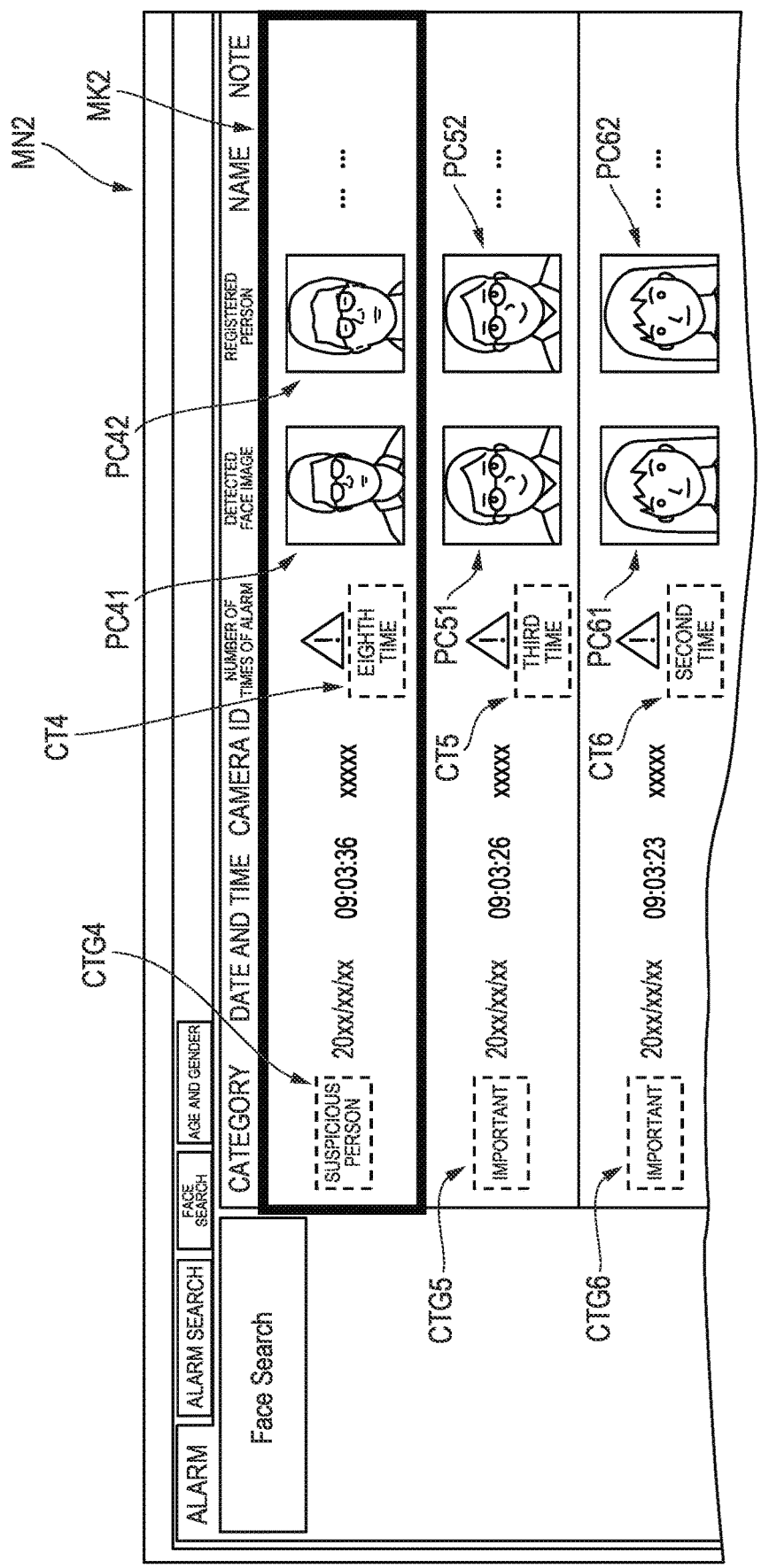
FIG. 7 is a diagram illustrating an example of a search result (suspicious person).

With reference to FIG. 7, a search result related to a suspicious person and generated by the server S1 will be described. FIG. 7 is a diagram illustrating an example of a search result MN2 related to a suspicious person. It is needless to say that the categories shown in FIG. 7 are merely examples, and the present invention is not limited thereto. In the example of the search result MN2 illustrated in FIG. 7, an example is shown in which a condition of the detection item of "number of times" among detection conditions is 6, a category of a person satisfying a condition of the detection item "number of times" being 5 or less is set to "important", and a category of a person satisfying a condition of the detection item "number of times" being 6 or more is set to "suspicious person".

As a search result, the search result MN2 illustrated in FIG. 7 is generated including a category of a person, an image capturing date and time when the best-shot image is captured, a camera ID as camera identification information, the number of times of alarm serving as the number of detection times in a detection period, a detected face image as a face cut-out image, a registered person as a face image registered in the registration database DB, and a name of a person in a face cut-out image. It is needless to say that the search result MN2 illustrated in FIG. 7 is merely an example, and the present invention is not limited thereto. The search result MN2 may be generated to include at least a category and a face cut-out image (detected face image). The search result MN2 illustrated in FIG. 7 includes a search field for each of three persons.

For a person of a detected face image PC41, a face image PC42 is registered in the registration database DB or the blacklist database DB2. Since the number of detection times in the detection period is "8" shown in a number of detection times field CT4 and satisfies the condition of the detection item "number of times", the person of the detected face image PC41 is displayed as "suspicious person" in a category field CTG4. In addition, since the condition of the detection item "number of times" is satisfied, a search field of the person of the detected face image PC41 is surrounded by a detection frame MK2 and highlighted.

For a person of a detected face image PC51, a face image PC52 is registered in the registration database DB. Since the number of detection times in the detection period is "3" shown in a number of detection times field CT5 and does not satisfy the condition of the detection item "number of times", the person of the detected face image PC51 is displayed as "important" in a category field CTG5.

For a person of a detected face image PC61, a face image PC62 is registered in the registration database DB. Since the number of detection times in the detection period is "2" shown in a number of detection times field CT6 and does not satisfy the condition of the detection item "number of times", the person of the detected face image PC61 is displayed as "important" in a category field CTG6.

Figure 8:
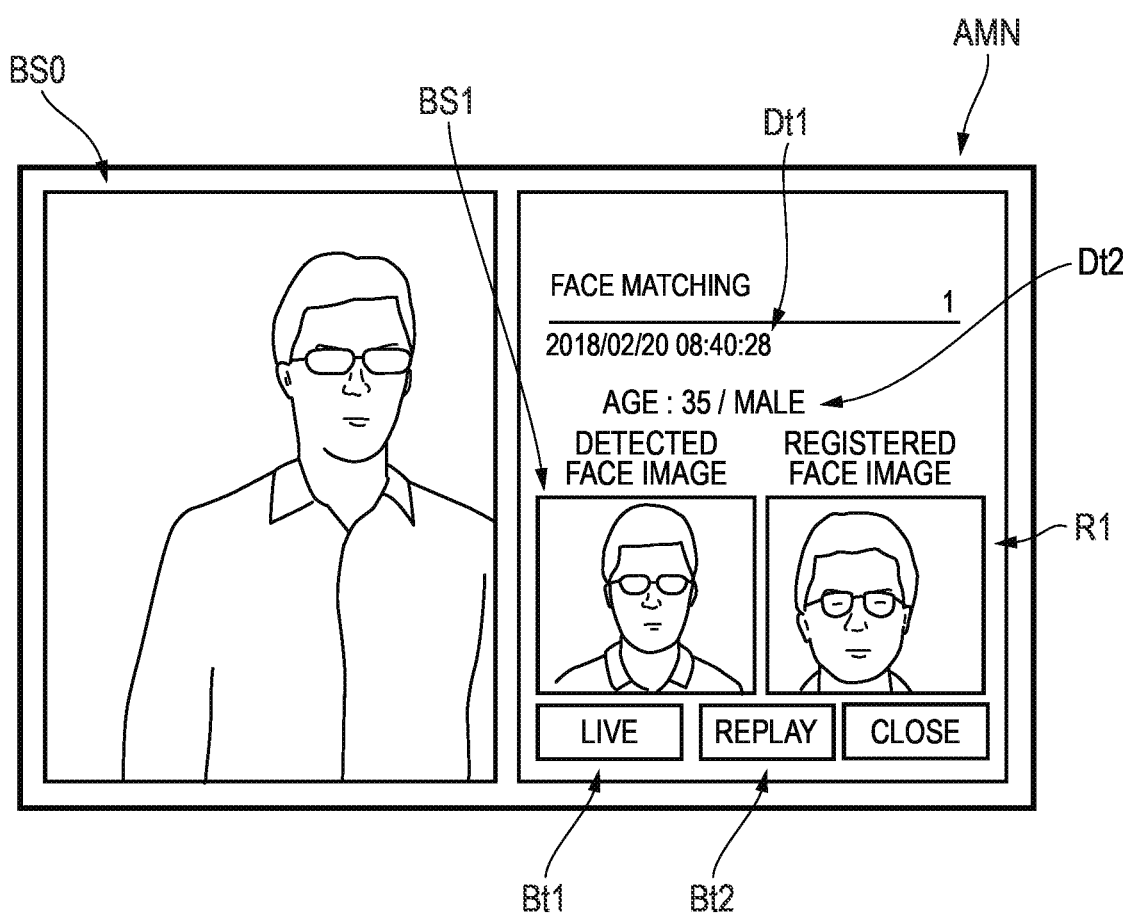
FIG. 8 is a diagram illustrating an alert notification screen.

Next, an alert notification screen AMN generated when the server S1 determines that a face cut-out image is the same as or similar to any one of the face images registered in the blacklist database DB2 will be described with reference to FIG. 8. FIG. 8 illustrates an example of the alert notification screen AMN. Although FIG. 8 illustrates an example in which it is determined that the face cut-out image is the same as or similar to any one of the face images registered in the blacklist database DB2, it is needless to say that the same alert notification screen may be generated when it is determined that a face cut-out image is the same as or similar to any one of the face images registered in the VIP list database DB1.

The alert notification screen AMN is generated including a best-shot image BS0, a detected face image BS1 as a face cut-out image, a registered face image R1 as a face image registered in the blacklist database DB2, information Dt1 of image capturing date and time when the best-shot image (face cut-out image) is captured, person information Dt2 related to a person of a face image registered in the blacklist database DB2, a live button Bt1, and a replay button Bt2.

It is needless to say that the alert notification screen AMN shown in FIG. 8 is merely an example, and the present invention is not limited thereto. The alert notification screen AMN may include at least the detected face image BS1 as a face cut-out image and the registered face image R1 as a face image registered in the blacklist database DB2.

When the live button Bt1 is selected (pressed) by a user operation after the alert notification screen AMN is displayed on the monitor 13 of the terminal device P1, a live video of the camera that captures the detected face image BS1 as the face cut-out image is played. When the live button Bt1 is selected (pressed) by the user operation, the terminal device P1 generates a control command for requesting a live video and transmits the control command to the server S1. The server S1 reads the live video captured by the camera that captures the detected face image BS1 as the face cut-out image, and transmits the live video to the terminal device P1, thereby playing the live video stream.

When the replay button Bt2 is selected (pressed) by a user operation after the alert notification screen AMN is displayed on the monitor 13 of the terminal device P1, a recorded video including a plurality of captured images before and after the detected face image BS1 captured as the face cut-out image is replayed. When the replay button Bt2 is selected (pressed) by the user operation, the terminal device P1 generates a control command for requesting recorded videos before and after the detected face image BS1 captured as the face cut-out image, and transmits the control command to the server S1. The server S1 reads the recorded video captured by the camera that captures the detected face image BS1 as the face cut-out image, and transmits the recorded video to the terminal device P1. Note that the server S1 may acquire a recorded video from each of the plurality of cameras C1, . . . or acquire a recorded video from an external recorder (not shown) or the like that is connected to the plurality of cameras C1, . . . or the server S1 so as to be capable of data communication and that can store a recorded video captured by each of the plurality of cameras C1, . . .

As described above, the face detection system 100 according to the embodiment has one or more cameras C1, . . . and the server S1 that are communicably connected to each other, acquires a captured video captured by the cameras C1, . . . detects a face of one or more persons based on the captured video, generates one or more face cut-out images by cutting out regions of the detected faces, counts the number of detection times a person the same as or similar to a person in a face cut-out image is detected in a predetermined detection period, determines a category of the person based on the number of detection times, and outputs the face cut-out image, the number of detection times and the category corresponding to the person in association with each other.

Accordingly, the face detection system 100 according to the embodiment can generate a search result obtained by detecting (searching) a person based on detection conditions and present to the user a search result in which the category of the detected person is set based on the number of detection times detected within a detection period set as a detection condition. As a result, the user can intuitively grasp the importance, priority, and the like of the detected (searched) person based on the category of the detected (searched) person included in the search result or based on the alert notification screen, and can efficiently perform monitoring and management service.

The face detection system 100 according to the embodiment acquires, as a condition for detecting a face of one or more persons, a detection condition (an example of a first detection condition) for detecting (searching) a "suspicious person", for example, counts the number of detection times of a person in a face cut-out image when it is determined that the person in the face cut-out image is a detection target satisfying the detection condition for detecting a suspicious person, and determines a category of the person to be a "suspicious person" when it is determined that the number of detection times is a predetermined number of times or more (that is, a condition of a detection item "number of times" of the detection condition is satisfied). Thus, the face detection system 100 can present a search result in which a "suspicious person" is determined to the user. Based on the category of the person included in the search result, the user can know that a suspicious person as a person to be noticed appears.

In addition, the face detection system 100 according to the embodiment acquires a detection condition for detecting a face of a suspicious person (an example of the first detection condition), counts the number of detection times of a person in a face cut-out image when it is determined that the person in the face cut-out image is not a detection target satisfying the detection condition for detecting (searching) a suspicious person, and determines a category of the person in the face cut-out image to be a "loyal customer" when it is determined that the number of detection times is a predetermined number of times or more. Accordingly, the face detection system 100 can determine that a person in a face cut-out image captured in a store is not a suspicious person, and can determines a category of the person whose number of detection times is large (that is, frequently visit the store) to be a "loyal customer" and present the result to the user. Therefore, it is possible for the user to know that a loyal customer as a person to be noticed appears based on the category of the person. Note that the category is not limited to the "loyal customer", and may be, for example, a "potential loyal customer" or a "regular customer". Accordingly, the user can search for, for example, a person as a potential loyal customer or a regular customer from a plurality of persons who enter and exit the store.

The face detection system 100 according to the embodiment acquires, as a condition for detecting a face of one or more persons, a detection condition (an example of a second detection condition) for detecting (searching) a "loyal customer", for example, counts the number of detection times of a person in a face cut-out image when it is determined that the person in the face cut-out image is a detection target satisfying the detection condition for detecting (searching) a loyal customer, and determines a category of the person to be a "loyal customer" when it is determined that the number of detection times is a predetermined number of times or more (that is, a condition of a detection item "number of times" of the detection condition is satisfied). Thus, the face detection system 100 can present a search result in which a "loyal customer" is determined to the user. Note that the category is not limited to the "loyal customer", and may be, for example, a "potential loyal customer" or a "regular customer". Therefore, it is possible for the user to know that a "loyal customer" as a person to be noticed appears based on the category of the person.

In addition, the face detection system 100 according to the embodiment registers a face cut-out image of a person having a category of "suspicious person" for each of the plurality of face images (examples of blacklist face images) registered in advance in the blacklist database DB2 by the user. Accordingly, the face detection system 100 according to the embodiment automatically registers a target "suspicious person" as a monitoring target in the monitoring service by the user in the blacklist database DB2, so that a person having the category of "suspicious person" as a person to be noticed particularly in a captured video can be searched.

In addition, the face detection system 100 according to the embodiment collates each of the plurality of face images registered in the blacklist database DB2 with a face cut-out image, and determines whether a face image the same as or similar to a person in the face cut-out image is registered. When it is determined that there is a face cut-out image that is the same as or similar to a blacklist face image, the face detection system 100 generates and outputs an alert notification screen AMN therefor. Accordingly, the face detection system 100 according to the embodiment presents the target, which is a monitoring target in the monitoring service by the user, on the alert notification screen as a face image of a person to be noticed particularly in a captured video, and can efficiently support the monitoring service targeted for person.

In addition, the face detection system 100 according to the embodiment registers, as a face image, a face cut-out image of a person having a category of "loyal customer" for each of the plurality of face images (examples of important person face images) registered in advance in the VIP list database DB1 by the user. Accordingly, the face detection system 100 according to the embodiment automatically registers a "loyal customer" to be noticed in the monitoring service by the user in the VIP list database DB1, so that a person having the category of "loyal customer" as a person to be noticed particularly in a captured image can be searched.

In addition, the face detection system 100 according to the embodiment collates each of the plurality of face images registered in the VIP list database DB1 with a face cut-out image, and determines whether an important person face image the same as or similar to a person in the face cut-out image is registered. When it is determined that there is a face cut-out image that is the same as or similar to a face image in the plurality of face images registered in the VIP list database DB1, the face detection system 100 generates and outputs an alert notification screen therefor. Accordingly, the face detection system 100 according to the embodiment can present an important person such as a "loyal customer" and a "loyal customer", which is a monitoring target in the monitoring service by the user, on the alert notification screen as a face image of a person to be noticed particularly in a captured video, and can efficiently support the monitoring service targeted for person.

In addition, the face detection system 100 according to the embodiment collates each of the plurality of face images (examples of non-detected face images) registered in advance in the white list database DB3 by the user with a face cut-out image, and determines whether a face image that is the same as or similar to the face cut-out image is registered. When it is determined that there is a face cut-out image that is the same as or similar to a face image in the plurality of face images registered in the white list database DB3, the face detection system 100 omits generation of an alert notification screen therefor. Accordingly, the face detection system 100 according to the embodiment can detect (search), as a face image of a person to be noticed particularly in a captured video, a person concerned such as an employee, a store staff, an administrator, a police officer, or a teacher who frequents a building, a facility, or the like in which the cameras C1, . . . are installed, and prevents the face image thereof from being presented to the user.

In addition, when a person in a face cut-out image is re-detected within a detection period (condition of the detection item "detection period" or "term of validity" included in the detection conditions), the face detection system 100 according to the embodiment extends the detection period of the person in the face cut-out image by the detection period (that is, the condition of the detection item "detection period" or the detection item "term of validity") from a timing of the re-detection. Accordingly, the face detection system 100 according to the embodiment can prevent, from the viewpoint of the detection period, generation of an alert notification screen for a face image of a person who is not to be noticed particularly in a captured video or whose attention level is low, and prevent the face image from being presented to the user.

Although various embodiments have been described with reference to the accompanying drawings, the present disclosure is not limited to such examples. It will be apparent to those skilled in the art that various changes, modifications, substitutions, additions, deletions, and equivalents can be conceived within the scope of the claims, and it should be understood that these changes, modifications, substitutions, additions, deletions, and equivalents also belong to the technical scope of the present invention. Components in the various embodiments mentioned above may be combined optionally in the range without deviating from the spirit of the invention.

Industrial Applicability

The present disclosure is useful as a face detection method, a face detection program, and a server for presenting a face image of a person to be noticed in a captured video and efficiently supporting a monitoring service targeted for person.

What is claimed is:

1. A face detection method to be implemented by a camera and a server that are communicably connected to each other, the face detection method comprising:
   acquiring a captured video captured by the camera;
   detecting a face of one or more persons based on the captured video;
   generating one or more face cut-out images by cutting out a region of the detected face;
   determining whether the detected face corresponds to a first detection condition or a second detection condition based on at least one detection item, the detection item not including a detection period or a number of times of detection;

determining, in response to the detected face corresponding to the first detection condition, whether a person who is same as or similar to a person in the face cut-out image is stored in a first database, and: counting a first number of detection times that the person who is the same as or similar to the person in the face cut-out image and stored in the first database is detected in a predetermined detection period; and storing the detected face in the first database in association with the first number of detection times, with each of detected faces being stored in the first database in association with a corresponding one of first numbers of detection times in response to the detected faces corresponding to the first detection condition;

determining, in response to the detected face corresponding to the second detection condition, whether the person who is the same as or similar to the person in the face cut-out image is stored in a second database, and: counting a second number of detection times that the person who is the same as or similar to the person in the face cut-out image and stored in the second database is detected in the predetermined detection period; and storing the detected face in the second database in association with the second number of detection times, with each of detected faces being stored in the second database in association with a corresponding one of second numbers of detection times in response to the detected faces corresponding to the second detection condition;

determining a category of the person based on one of the first number of detection times or the second number of detection times; and outputting the face cut-out image corresponding to the person, the one of the first number of detection times or the second number of detection times corresponding to the person, and the category corresponding to the person in association, wherein the face detection method further comprises:
registering persons in the first database based on face cut-out images from captured images, the persons registered in the first database being suspicious persons; and
registering persons in the second database based on printed images of the persons, the persons registered in the second database being registered customers.

2. The face detection method according to claim 1, further comprising:
acquiring the first detection condition; and
counting the first number of detection times of the person in the face cut-out image when the person in the face cut-out image is a detection target satisfying the first detection condition; and
determining the category of the person to be a suspicious person when the first number of detection times is a predetermined number of times or more.

3. The face detection method according to claim 2, wherein
the first detection condition is for detecting a person having the category of a suspicious person.

4. The face detection method according to claim 2, further comprising:
registering the face cut-out image of the person having the category of the suspicious person as a blacklist face image on each of a plurality of blacklist face images registered in advance by a user.

5. The face detection method according to claim 4, wherein
each of the plurality of blacklist face images is matched with the face cut-out image to determine whether the blacklist face image that is same as or similar to the person in the face cut-out image is registered in the first database, and
when the face cut-out image that is the same as or similar to the blacklist face image is registered in the first database, an alert notification screen is generated and output.

6. The face detection method according to claim 1, further comprising:
acquiring the first detection condition;
counting the first number of detection times of the person in the face cut-out image when the person in the face cut-out image is not a detection target satisfying the first detection condition; and
determining the category of the person to be a loyal customer when the first number of detection times is a predetermined number of times or more.

7. The face detection method according to claim 6, further comprising:
registering the face cut-out image of the person having the category of the loyal customer as an important person face image on each of a plurality of important person face images registered in advance by a user.

8. The face detection method according to claim 7, wherein
each of the plurality of important person face images is matched with the face cut-out image to determine whether the important person face image that is same as or similar to the face cut-out image is registered in the second database, and
when the face cut-out image that is the same as or similar to the important person face image is registered in the second database, an alert notification screen is generated and output.

9. The face detection method according to claim 1, further comprising:
acquiring the second detection condition;
counting the second number of detection times of the person in the face cut-out image when the person in the face cut-out image is a detection target satisfying the second detection condition; and
determining the category of the person to be a loyal customer when the second number of detection times is a predetermined number of times or more.

10. The face detection method according to claim 9, wherein
the second detection condition is for detecting a person having the category of a loyal customer.

11. The face detection method according to claim 9, further comprising:
registering the face cut-out image of the person having the category of the loyal customer as an important person face image on each of a plurality of important person face images registered in advance by a user.

12. The face detection method according to claim 11, wherein
each of the plurality of important person face images is matched with the face cut-out image to determine whether the important person face image that is the same as or similar to the face cut-out image is registered in the second database, and when the face cut-out image that is the same as or similar to the important person face image is registered in the second database, an alert notification screen is generated and output.

13. The face detection method according to claim 1, wherein
each of a plurality of non-detected face images registered in advance by a user is matched with the face cut-out image to determine whether a non-detected face image that is same as or similar to the face cut-out image is registered, and
when the face cut-out image that is the same as or similar to the non-detected face image is registered, generation of an alert notification screen is omitted.

14. The face detection method according to claim 1, wherein
when the person in the face cut-out image is re-detected within the detection period, a detection period of the person in the face cut-out image is extended by the detection period from a timing of the re-detection.

15. A computer readable non-transitory storage medium on which a face detection program executed by a server communicably connected to a camera is stored, the face detection program causing the server to execute a process including:
acquiring a captured video captured by the camera;
detecting a face of one or more persons based on the captured video;
generating one or more face cut-out images by cutting out a region of the detected face;
determining whether the detected face corresponds to a first detection condition or a second detection condition based on at least one detection item, the detection item not including a detection period or a number of times of detection;
determining, in response to the detected face corresponding to the first detection condition, whether a person who is same as or similar to a person in the face cut-out image is stored in a first database, and; counting a first number of detection times that the person who is the same as or similar to the person in the face cut-out image and stored in the first database is detected in a predetermined detection period; and storing the detected face in the first database in association with the first number of detection times, with each of detected faces being stored in the first database in association with a corresponding one of first numbers of detection times in response to the detected faces corresponding to the first detection condition;
determining, in response to the detected face corresponding to the second detection condition, whether the person who is the same as or similar to the person in the face cut-out image is stored in a second database, and: counting a second number of detection times that the person who is the same as or similar to the person in the face cut-out image and stored in the second database is detected in the predetermined detection period; and storing the detected face in the second database in association with the second number of detection times, with each of detected faces being stored in the second database in association with a corresponding one of second numbers of detection times in response to the detected faces corresponding to the second detection condition;
determining a category of the person based on one of the first number of detection times or the second number of detection times; and outputting the face cut-out image corresponding to the person, the one of the number of first detection times or the second number of detection times corresponding to the person, and the category corresponding to the person in association,
wherein the process further includes:
registering persons in the first database based on face cut-out images from captured images, the persons registered in the first database being suspicious persons; and
registering persons in the second database based on printed images of the persons, the persons registered in the second database being registered customers.

16. A server communicably connected to a camera, the server comprising:
an interface that acquires a captured video captured by the camera;
a processor that
detects a face of one or more persons based on the captured video acquired by the interface,
generates one or more face cut-out images by cutting out a region of the detected face,
determines whether the detected face corresponds to a first detection condition or a second detection condition based on at least one detection item, the detection item not including a detection period or a number of times of detection,
determines, in response to the detected face corresponding to the first detection condition, whether a person who is same as or similar to a person in the face cut-out image is stored in a first database, and; counts a first number of detection times that the person who is the same as or similar to the person in the face cut-out image and stored in the first database is detected in a predetermined detection period; and stores the detected face in the first database in association with the first number of detection times, with each of detected faces being stored in the first database in association with a corresponding one of first numbers of detection times in response to the detected faces corresponding to the first detection condition,
determines, in response to the detected face corresponding to the second detection condition, whether the person who is the same as or similar to the person in the face cut-out image is stored in a second database, and; counts a second number of detection times that the person who is the same as or similar to the person in the face cut-out image and stored in the second database is detected in the predetermined detection period; and stores the detected face in the second database in association with the second number of detection times, with each of detected faces being stored in the second database in association with a corresponding one of second numbers of detection times in response to the detected faces corresponding to the second detection condition, and
determines a category of the person based on one of the first number of detection times or the second number of detection times; and
an output that outputs the face cut-out image corresponding to the person, the one of the first number of detection times or the second number of detection times corresponding to the person, and the category corresponding to the person in association, wherein the processor further:
  registers persons in the first database based on face cut-out images from captured images, the persons registered in the first database being suspicious persons; and
  registers persons in the second database based on printed images of the persons, the persons registered in the second database being registered customers.

* * * * *